US009008930B2

(12) United States Patent
Saito et al.

(10) Patent No.: US 9,008,930 B2
(45) Date of Patent: Apr. 14, 2015

(54) CONTROL APPARATUS FOR VEHICULAR AUTOMATIC TRANSMISSION

(75) Inventors: Hidenori Saito, Nagoya (JP); Toshio Sugimura, Nagoya (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 65 days.

(21) Appl. No.: 13/990,570

(22) PCT Filed: Dec. 6, 2010

(86) PCT No.: PCT/JP2010/071794

§ 371 (c)(1),
(2), (4) Date: Jun. 4, 2013

(87) PCT Pub. No.: WO2012/077170

PCT Pub. Date: Jun. 14, 2012

(65) Prior Publication Data

US 2013/0253786 A1 Sep. 26, 2013

(51) Int. Cl.

| | |
|---|---|
| ***G06F 7/00*** | (2006.01) |
| ***F16H 61/68*** | (2006.01) |
| ***F16H 61/12*** | (2010.01) |
| *F16H 61/686* | (2006.01) |

(52) U.S. Cl.

CPC ................ *F16H 61/68* (2013.01); *F16H 61/12* (2013.01); *F16H 61/686* (2013.01); *F16H 2061/1232* (2013.01); *F16H 2061/1268* (2013.01); *F16H 2061/1208* (2013.01)

(58) Field of Classification Search

USPC ........................................................... 701/55

See application file for complete search history.

(56) References Cited

U.S. PATENT DOCUMENTS

| | | | | |
|---|---|---|---|---|
| 6,024,671 | A | 2/2000 | Sawa et al. | |
| 6,357,289 | B1 | 3/2002 | Futawatari | |
| 2007/0021260 | A1 * | 1/2007 | Nozaki et al. | 475/119 |
| 2007/0298932 | A1 * | 12/2007 | Yoneyama | 477/120 |
| 2008/0140290 | A1 | 6/2008 | Kuwahara et al. | |
| 2008/0167155 | A1 * | 7/2008 | Kawaguchi et al. | 475/119 |
| 2009/0017983 | A1 * | 1/2009 | Iwase et al. | 477/3 |
| 2010/0056334 | A1 * | 3/2010 | Toi et al. | 477/158 |
| 2010/0229969 | A1 * | 9/2010 | Ishikawa et al. | 137/511 |
| 2011/0056317 | A1 * | 3/2011 | Sato | 74/473.11 |
| 2011/0224878 | A1 * | 9/2011 | Nakamura et al. | 701/56 |
| 2011/0270483 | A1 * | 11/2011 | Endo et al. | 701/29 |
| 2012/0323456 | A1 * | 12/2012 | Kato et al. | 701/55 |

FOREIGN PATENT DOCUMENTS

| | | |
|---|---|---|
| JP | A-05-272633 | 10/1993 |
| JP | A-09-317875 | 12/1997 |
| JP | A-11-280887 | 10/1999 |

(Continued)

*Primary Examiner* — Hussein A. Elchanti
(74) *Attorney, Agent, or Firm* — Oliff PLC

(57) ABSTRACT

A control apparatus for a vehicular automatic transmission configured to selectively establish a plurality of shift positions by respective combinations of frictional coupling devices of a plurality of frictional coupling devices in an engaged state thereof, with output hydraulic pressures of respective ones of a plurality of solenoid valves provided in a hydraulic control circuit, includes a fail-safe control portion configured to perform a predetermined fail-safe function when shifting direction values requiring a shifting control of said vehicular automatic transmission and shifting output values respectively generated according to said shifting direction values are not coincident with each other, said shifting output values being represented by respective electric signals for driving said plurality of solenoid valves.

8 Claims, 6 Drawing Sheets

(56) References Cited

FOREIGN PATENT DOCUMENTS

| | | |
|---|---|---|
| JP | A-2001-059570 | 3/2001 |
| JP | A-2007-1 13736 | 5/2007 |
| JP | A-2008-281111 | 11/2008 |
| JP | A-2009-281578 | 12/2009 |
| JP | A-2009-293498 | 12/2009 |

* cited by examiner

| | C1 | C2 | C3 | C4 | B1 | B2 | F1 |
|---|---|---|---|---|---|---|---|
| 1st | ○ | | | | | ◎ | ○ |
| 2nd | ○ | | | | ○ | | |
| 3rd | ○ | | ○ | | | | |
| 4th | ○ | | | ○ | | | |
| 5th | ○ | ○ | | | | | |
| 6th | | ○ | | ○ | | | |
| 7th | | ○ | ○ | | | | |
| 8th | | ○ | | | ○ | | |
| R1 | | | ○ | | | ○ | |
| R2 | | | | ○ | | ○ | |
| N | | | | | | | |

○ : ENGAGED

◎ : ENGAGED UPON REVERSE POWER TRANSMISSION

CONTROL APPARATUS FOR VEHICULAR AUTOMATIC TRANSMISSION

TECHNICAL FIELD

The present invention relates to a control apparatus for a vehicular automatic transmission configured to perform shifting actions by using a plurality of solenoid valves provided in a hydraulic control circuit.

BACKGROUND ART

There is well known a control apparatus for a vehicular automatic transmission configured to selectively establish a plurality of shift positions by engaging respective combinations of frictional coupling devices selected from a plurality of frictional coupling devices, with output hydraulic pressures of respective ones of a plurality of solenoid valves provided in a hydraulic control circuit. The above-indicated hydraulic control circuit has a risk of occurrence of an abnormal output of any solenoid valve, which takes place due to an abnormality of an electronic control device per se, which operates to determine a need for shifting the automatic transmission and generate an electric signal. Such abnormal output of the solenoid valve may cause an engaging action of any irrelevant frictional coupling device other than the frictional coupling devices normally required to be placed in the engaged state for establishing the presently selected shift position of the automatic transmission, namely, any frictional coupling device not normally required to be placed in the engaged state for establishing the selected shift position. In this event, the engaging action of the above-indicated frictional coupling device may cause the automatic transmission to perform an unnecessary shifting action from the presently established shift position [for example, a shifting action causing a comparatively high ratio of a stepping change of the speed ratio of the automatic transmission (stepping ratio=ratio of speed ratios of two shift positions=speed ratio of the lower-speed position/speed ratio of the higher-speed position)], or may cause a partially engaged state (a slipping action) of any one of the frictional coupling devices normally required to be placed in its engaged state, which one frictional coupling device has the relatively smallest torque capacity. Namely, the abnormality of the electronic control device per se may influence a shifting control of the automatic transmission.

In view of a possibility of occurrence of an abnormality of the electronic control device per se, there has been proposed to provide the hydraulic control circuit with a fail-safe valve having a fail-safe function to prevent the engaging action of a frictional coupling device due to an abnormal output of a solenoid valve, by cutting off an oil passage provided to apply the output hydraulic pressure of the abnormal solenoid valve to the frictional coupling device, or to establish a fail-safe shift position so as to reduce the stepping ratio (difference) of the speed ratios, by switching the oil passages utilizing the output hydraulic pressure of the abnormal solenoid valve. On the other hand, it is desirable not to use the fail-safe valve, from the standpoint of needs for reducing the weight and size of the hydraulic control circuit and for reducing the number of the required components or costs. Namely, it is desirable to provide a fail-safe function equivalent to that of the fail-safe valve, without using the fail-safe valve. Patent Document 1 discloses a control apparatus for a transmission configured to perform shifting actions using a hydraulic control circuit not provided with the fail-safe valve, which control apparatus determines, on the basis of amounts of electric current applied to solenoid valves, whether the number of the solenoid valves concurrently placed in the engaged state is larger than in the normal states of the solenoid valves, and cuts off the supply of an electric power to the irrelevant solenoid valve other than the solenoid valves required to be placed in the engaged state, if the number is determined to be larger than in the normal states, so that the control apparatus performs the fail-safe function equivalent to that of the fail-safe valve.

PRIOR ART DOCUMENT

Patent Document

Patent Document 1: JP-2008-281111A
Patent Document 2: JP-2007-113736A

SUMMARY OF THE INVENTION

Object Achieved by the Invention

The technique disclosed in the Patent Document 1 makes it possible to eliminate the need for providing the fail-safe valve, but requires an additional electric circuit for detecting a total amount of electric current applied to the solenoid valves, a switch for connecting and disconnecting a signal line for supplying an electric power to the irrelevant solenoid valve, and an electric circuit for opening and closing the switch on the basis of the detected total amount of electric current. Further, the technique disclosed in the Patent Document 1 which depends upon the total amount of the electric current applied to the solenoid valves, to detect an abnormality, does not permit determination of the solenoid valve to which the electric current is abnormally applied, and detection of an abnormality which takes place where the total amount of electric current is normal. Accordingly, the technique in question does not necessarily permit the fail-safe function to be adequately performed. Thus, the hydraulic control circuit not provided with the fail-safe valve is required to be further improved in its fail-safe function equivalent to that of the fail-safe valve. In this respect, it is noted that the problem described above is not publicly known, and that there has been no proposal to permit an adequate fail-safe function to be performed in the event of occurrence of an abnormality of the electronic control device, without using the fail-safe valve and without requiring an additional hardware to perform the fail-safe function.

The present invention was made in view of the background art described above. It is therefore an object of the present invention to provide a control apparatus configured to be able to perform an adequate fail-safe function in the event of occurrence of an abnormality of an electronic control device, without providing a hydraulic control circuit with a fail-safe valve.

Means for Achieving the Object

The object indicated above can be achieved according to the principle of this invention, which provides a control apparatus for (a) a vehicular automatic transmission configured to selectively establish a plurality of shift positions by respective combinations of frictional coupling devices of a plurality of frictional coupling devices in an engaged state thereof, with output hydraulic pressures of respective ones of a plurality of solenoid valves provided in a hydraulic control circuit, the control apparatus being characterized by (b) performing a predetermined fail-safe function when shifting direction values requiring a shifting control of the above-described vehicular automatic transmission and shifting output values respectively generated according to the above-described shifting direction values are not coincident with each other.

Advantages of the Invention

The control apparatus described above is configured to perform the predetermined fail-safe function when the shifting direction values requiring the shifting control of the above-described vehicular automatic transmission and the shifting output values respectively generated according to the above-described shifting direction values are not coincident with each other, so that the fail-safe function thus performed makes it possible to minimize an influence of an abnormality of the control apparatus per se, in the event of the engaging action of an irrelevant frictional coupling device taking place due to the abnormality of the control apparatus per se, which irrelevant frictional coupling device is other than the frictional coupling devices normally required to be placed in the engaged state for establishing a presently selected shift position of the automatic transmission. Thus, the present control apparatus is configured to be able to perform an adequate fail-safe function in the event of occurrence of an abnormality of the control apparatus, without providing a hydraulic control circuit with a fail-safe valve, and without requiring an additional hardware to perform the fail-safe function. Further, the present control apparatus has an additional advantage of elimination of a need for using a fail-safe valve and providing an additional hardware to perform the fail-safe function, and a consequent freedom from a risk of occurrence of an abnormality of the fail-safe valve per se due to sticking of its spool caused by a foreign matter, or an abnormality of the additional hardware. Accordingly, the reliability and accuracy of the fail-safe function are improved.

In one preferred form of the present invention, the above-described predetermined fail-safe function in a case that the shifting direction values and the shifting output values are not coincident each other is performed by changing any of the above-described shifting direction values with which a corresponding one of the above-described shifting output values is not coincident. In this form of the invention, the fail-safe function can be adequately performed by utilizing the engaging action of the irrelevant frictional coupling device taking place due to the abnormality of the control apparatus per se, which irrelevant frictional coupling device is other than the frictional coupling devices normally required to be placed in the engaged state for establishing the presently selected shift position of the automatic transmission.

In another preferred form of the invention, any of the above-described shifting output values which is not coincident with the corresponding one of the above-described shifting direction values is determined according to a table of coincidence stored in a memory, which table indicates a relationship between the above-described plurality of shift positions and the respective combinations of the frictional coupling devices to be placed in the engaged state. In this form of the invention, it is possible to adequately determine whether each of the shifting direction values and the corresponding one of the shifting output values are coincident with each other, and to perform the fail-safe function with a high degree of stability, on the basis of any of the shifting direction values which is not coincident with the corresponding one of the shifting output values.

In a further preferred form of the invention, the above-described predetermined fail-safe function in a case that the shifting direction values and the shifting output values are not coincident each other is performed by implementing a shifting action of the vehicular automatic transmission to one of the shift positions, using an engaging action of the frictional coupling device which takes place with an output hydraulic pressure of one of the above-described solenoid valves which corresponds to one of the above-described shifting output values which is not coincident with the corresponding shifting direction value. In this form of the invention, the fail-safe function can be adequately performed by utilizing the engaging action of the irrelevant frictional coupling device taking place due to the abnormality of the control apparatus per se, which irrelevant frictional coupling device is other than the frictional coupling devices normally required to be placed in the engaged state for establishing the presently selected shift position of the automatic transmission. For example, the fail-safe function makes it possible to avoid a problem that the engaging action of the irrelevant friction coupling device causes a partially engaging action of one of the frictional coupling devices which are to be normally placed in its engaged state.

In a still further preferred form of this invention, the vehicular automatic transmission is shifted from the shift position to be established when the above-indicated shifting direction values and the above-indicated shifting output values are coincident to each other, to the above-indicated one of the shift positions to be established using the engaging action of the frictional coupling device which takes place with the output hydraulic pressure of one of the above-described solenoid valves which corresponds to one of the above-indicated shifting output values which is not coincident with the corresponding shifting direction value, such that the shifting action to the above-indicated one of the shift positions causes a lowest stepping change between speed ratios of the shifting, or a shift-up action. In this form of the invention, the fail-safe function makes it possible to prevent any shift-down action of the automatic transmission causing a comparatively high ratio of the stepping change of the speed ratio, in the event of occurrence of an abnormality of the control apparatus per se, and the consequent engaging action of the irrelevant frictional coupling device other than the frictional coupling devices normally required to be placed in the engaged state for establishing the presently selected shift position of the automatic transmission. Accordingly, it is possible to minimize a rise of an operating speed of an engine, and deceleration of a vehicle due to an engine braking torque, which take place in the event of occurrence of the abnormality of the control apparatus per se, and which may result in reduction of durability of the engine and a vehicular power transmitting system and reduction (deterioration) of drivability of the vehicle.

In a yet further preferred form of the invention, the above-described shifting direction values are shifting command values commanding to implement the shifting control of the above-described vehicular automatic transmission, or shifting implementation values on the basis of which a need for implementing the above-indicated shifting control is determined, while the above-described shifting output values are electric signals for respectively driving the above-described plurality of solenoid valves, or output hydraulic pressures of the solenoid valves. This form of the invention permits the fail-safe function to be adequately performed in the event of occurrence of an abnormality of the control apparatus per se, depending upon whether the above-indicated shifting direction values and the above-indicated shifting output values are coincident with each other.

MODE FOR CARRYING OUT THE INVENTION

Figure 1:
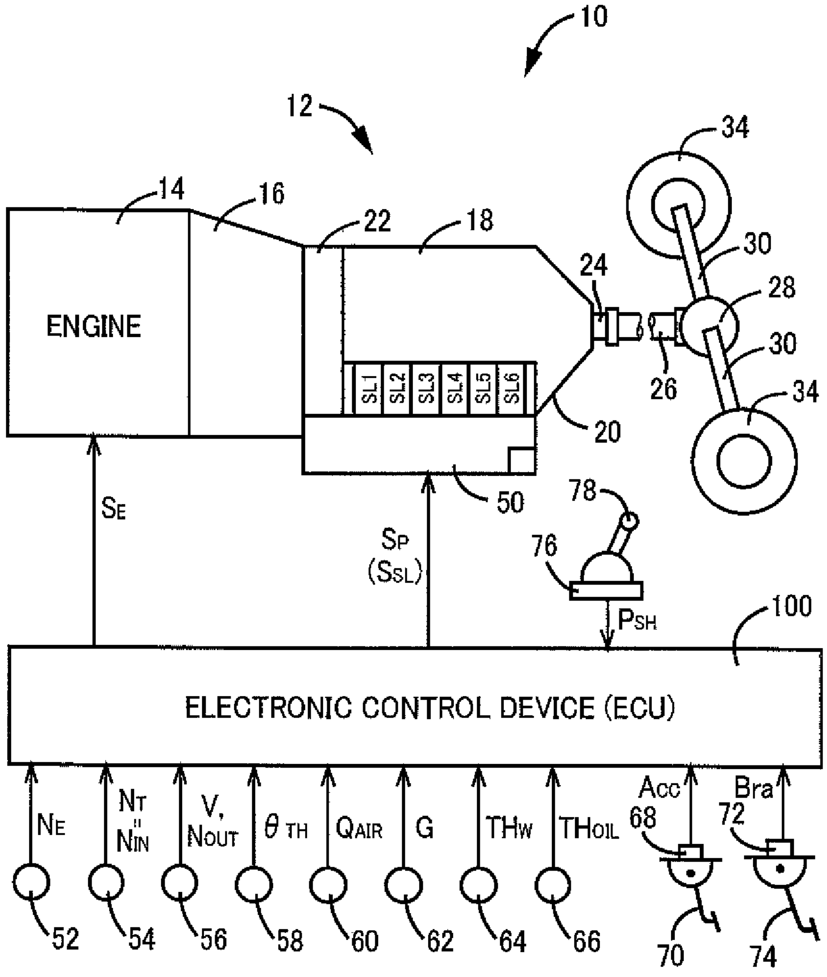
FIG. 1 is a schematic view for explaining an arrangement of a power transmitting path of a vehicle to which the present invention is applicable, and a major portion of a control system provided on the vehicle.

According to the present invention, the above-described vehicular automatic transmission is preferably a step-variable automatic transmission in which a plurality of speed ratios can be mechanically established. For instance, the step-variable automatic transmission is a multiple-step transmission of various planetary gear types constituted by a plurality of planetary gear sets having rotary elements (rotary members) which are selectively connected to each other by frictional coupling devices, to selectively establish four, five, six or more shift positions (gear positions) as forward shift positions, for example. The frictional coupling devices used in the multiple-step transmission of the planetary gear type may be commonly used coupling devices such as multiple-disk or single-disk type clutches and brakes, or belt-type brakes, which are placed in the engaged state by respective hydraulic actuators. An oil pump for supplying a working oil to those coupling devices may be driven by a vehicle drive power source, for example, to pressurize the working oil, or may be driven by an electric motor exclusively provided independently of the vehicle drive power source.

A hydraulic control circuit including the above-indicated coupling devices is preferably configured, from the standpoint of its operating response, to apply an output hydraulic pressure of each linear solenoid valve directly to the hydraulic actuator (hydraulic cylinder) of the corresponding coupling device, but may be provided with a shift control valve which is controlled according to the output hydraulic pressures of the linear solenoid valves used as pilot pressures, so that the working oil is supplied from the shift control valve to the hydraulic actuators.

Preferably, the above-indicated linear solenoid valves are provided for respective ones of a plurality of coupling devices. However, various arrangements of the linear solenoid valves are available. Where the coupling devices include a plurality of coupling devices whose engaging actions or engaging and releasing actions are not concurrently controlled, for example, a common linear solenoid valve may be provided for those coupling devices. The operating states of all coupling devices need not be hydraulically controlled by the linear solenoid valves, and the operating states of all or some of the coupling devices may be hydraulically controlled by ON-OFF solenoid valves or any other pressure regulating means, the duty ratios of which are controlled to control the coupling devices. The expression "apply the hydraulic pressure" used herein is interpreted to mean "cause the hydraulic pressure to act on the appropriate device" or "supply the working oil of the hydraulic pressure to the appropriate device".

The above-indicated vehicle drive power source is preferably an engine commonly used as an internal combustion engine, such a gasoline engine and a diesel engine. An electric motor or electric motors, for example, may be used as an assisting vehicle drive power source, in addition to the engine. Alternatively, only an electric motor or electric motors may be used as the vehicle drive power source.

Embodiments of this invention will be described in detail by reference to the drawings.

Embodiments

Figures 2, 3:
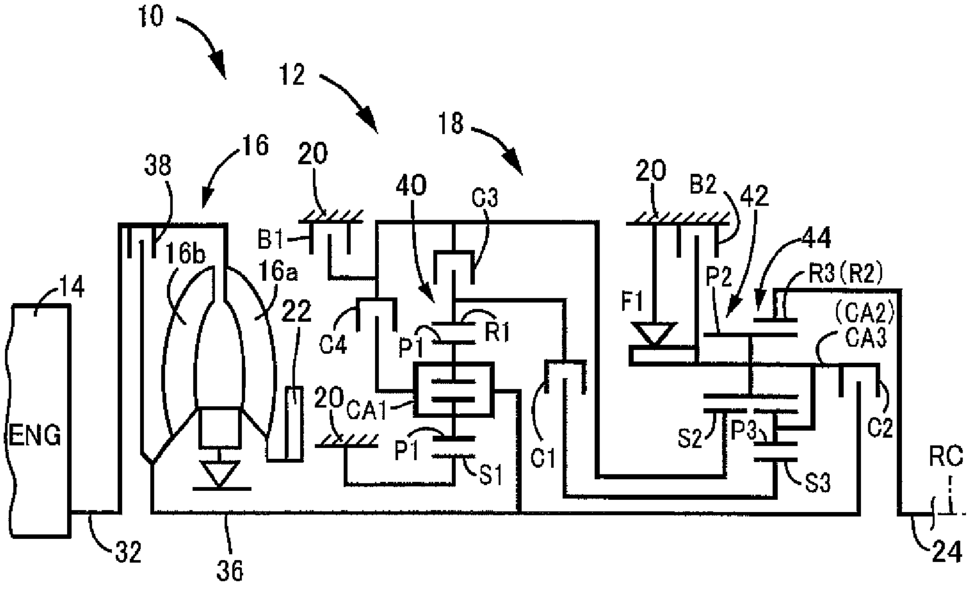
FIG. 2 is a schematic view for explaining a power transmitting system of the vehicle.
FIG. 3 is a table indicating a relationship between shift positions of an automatic transmission and respective combinations of operating states of coupling devices therein.

FIG. 1 is the schematic view for explaining an arrangement of a power transmitting path between an engine 14 and drive wheels 34 of a vehicle 10 to which the present invention is applicable, and a major portion of a control system provided on the vehicle 10, which is configured to implement an output control of the engine 14 and a shift control of a vehicular automatic transmission 18 (hereinafter referred to as "automatic transmission 18"). FIG. 2 is the schematic view for explaining the automatic transmission 18. It is noted that a lower half of each of a torque converter 16, the automatic transmission 18, etc., which are roughly symmetrical in construction with respect to an axis (axis RC), is not shown in FIG. 2. It is also noted that the axis RC indicated in FIG. 2 is an axis of rotation of the engine 14 and the torque converter 16.

As shown in FIGS. 1 and 2, a vehicular power transmitting system 12 (hereinafter referred to as "power transmitting system 12") is provided with the torque converter 16, an oil pump 22, and the automatic transmission 18, which are disposed on the axis RC within a transmission casing 20 (hereinafter referred to as "casing 20"), in the order of description as viewed from the engine 14. The casing 20 is a non-rotatable member which is fixed to the vehicle body by fastening with bolts and nuts. The power transmitting system 12 is further provided with a propeller shaft 26 connected to an output rotary member in the form of an output shaft 24 of the automatic transmission 18, a differential gear device (differential gear) 28 connected to the propeller shaft 26, and a pair of axles 30 connected to the differential gear device 28. The power transmitting system 12 thus constructed is suitably used for the vehicle 10 of an FR (front-engine rear-drive) type. In the power transmitting system 12, a drive force of the engine 14 is transmitted from a crankshaft 32 to the pair of drive wheels 34 through the torque converter 16, automatic transmission 18, propeller shaft 26, differential gear device 28 and pair of axles 30 in the order of description.

The torque converter 16 is a fluid-operated power transmitting device disposed on the axis RC and configured to transmit a drive force received by its pump impeller **16*a*, to the automatic transmission 18 through a working fluid. This pump impeller 16*a* is an input rotary element which is connected to the engine 14 through the crankshaft 32 to receive the drive force of the engine 14 and which is rotatable about the axis RC. The torque converter 16 has a turbine impeller 16*b* which is an output rotary element spline-connected or otherwise connected to an input rotary member in the form of an input shaft 36 of the automatic transmission 18, such that the turbine impeller 16***b* is rotated together with the input shaft 36. The torque converter 16 is further provided with a lock-up clutch 38. This lock-up clutch 38 is a direct coupling clutch which disposed between the pump impeller 16*a* and the turbine impeller 16*b* and which is placed in an engaged state, a slipping state and a released state by the hydraulic control.

The oil pump 22 is a mechanical oil pump connected to the pump impeller 16*a* and operated by the engine 14 to generate a hydraulic pressure for shifting the automatic transmission 18, controlling the torque capacity of the lock-up clutch 38, and supplying a lubricant to various points in the power transmitting path of the vehicle 10.

The automatic transmission 18 is a multiple-step transmission of a planetary gear type which constitutes a part of the power transmitting path between the engine 14 and the drive wheels 34 and which functions as a step-variable automatic transmission which is shifted to selectively establish a plurality of shift positions (gear positions) by respective combinations of operating states (namely, engaged and released states) of a plurality of hydraulically operated frictional coupling devices. For instance, the automatic transmission 18 is a step-variable transmission which is commonly used in a known vehicle and configured to perform so-called "clutch-to-clutch" shifting actions. The automatic transmission 18 has a first planetary gear set 40 of a double-pinion type, a Ravigneaux type second planetary gear set 42 of a single-pinion type, and a third planetary gear set 44 of a double-pinion type, which are coaxially disposed (on the axis RC), and is constructed to transmit a rotary motion of the input shaft 36 to the output shaft 24, at the selected speed ratio. This input shaft 36 is a turbine shaft rotated by the turbine impeller 16*b* of the torque converter 16.

As is well known, each of the first planetary gear set 40, second planetary gear set 42 and third planetary gear set 44 is constituted by three rotary elements (rotary members) consisting of: a sun gear (S1, S2, S3); a carrier (CA1, CA2, CA3) supporting a pinion gear (P1, P2, P3) such that the planetary gear is rotatable about its axis and about the axis of the sun gear; and a ring gear (R1, R2, R3) meshing with the sun gear through the pinion gear. Some of these three rotary elements are directly fixed together, or is/are indirectly (or selectively) connected to each other or to the input shaft 36, casing 20 or output shaft 24, through hydraulically operated frictional coupling devices (clutches C1, C2, C3 and C4, and brakes B1 and B2) or a one-way clutch F1.

The above-described clutches C1, C2, C3 and C4 and brakes B1 and B2 (hereinafter collectively referred to as clutches C and brakes B, or coupling devices, unless otherwise specified) are hydraulically operated frictional coupling devices used in a conventional vehicular automatic transmission. Each of these frictional coupling devices is constituted by a wet-type multiple-disc clutch or brake whose friction plates which are forced against each other by a hydraulic actuator, or a band brake whose band is wound is tightened by a hydraulic actuator. Each of the clutches C and brakes B is selectively engaged or released by a hydraulic control circuit 50, and the torque capacity or engaging force of each clutch or brake is variable continuously, for example, by hydraulic pressure regulation by linear solenoid valves provided in the hydraulic control circuit 50, so that two members between which each clutch or brake is interposed are selectively connected or fixed to each other. It is noted that the torque capacity of each coupling device is determined by the friction coefficient of friction plates of the coupling device, and by the engaging hydraulic pressure with which the friction plates are forced against each other, and that for each coupling device to be able to transmit a required vehicle driving torque (required transmission input torque $T_{AT}$, for example) without slipping of the coupling device, the torque capacity of the coupling device should be larger than its assigned torque value corresponding to the required vehicle driving torque. For easy understanding of the present embodiment, the torque capacity and the engaging hydraulic pressure of each coupling device will be similarly handled, where appropriate.

By selectively engaging and releasing the clutches C and brakes B, eight forward-drive shift positions and two reverse-drive shift positions (gear positions) are established, according to an operation of the accelerator pedal by the vehicle operator, and a running speed V of the vehicle, for example, as indicated in the table of FIG. 3 indicating the operating states of the clutches C and brakes B. It is noted that "$1^{st}$" through "$8^{th}$" indicated in FIG. 3 respectively represent the forward-drive shift positions in the form of $1^{st}$ through $8^{th}$ speed or shift positions, and "R1" and "R2" respectively represent the reverse-drive shift positions in the form of a first reverse-drive position and a second reverse-drive position, while "N" represents a non-drive neutral position. A speed ratio γ of each gear position of the automatic transmission 18 (=input speed $N_{IN}$/output speed $N_{OUT}$) is appropriately determined by gear ratios ρ1, ρ2 and ρ3 of the first planetary gear set 40, second planetary gear set 42 and third planetary gear set 44 (gear ratio=number of teeth of the sun gear/number of teeth of the ring gear).

The table of FIG. 3 indicates the relationship between the above-described shift positions and the operating states of the clutches C and brakes B. In this table, single-circles indicate the engaged state, and a double-circle indicates the engaged state during transmission of power in the reverse direction, while blanks indicate the released state. The automatic transmission 18 is placed in a selected one of a plurality of shift positions by engaging a corresponding combination of frictional coupling devices (two frictional coupling devices, for example) selected from the plurality of frictional coupling devices, with the output hydraulic pressures received from the respective linear solenoid valves provided in the hydraulic control circuit 50, as indicated in FIG. 3. In the automatic transmission 18 according to the present embodiment, the one-way clutch F1 is disposed in parallel to the brake B2, between the integrally formed carriers CA2, CA3 and the casing 20, such that the one-way clutch F1 permits rotary motions of the carriers CA2, CA3 in a forward direction (direction of rotation of the transmission input shaft 36), but inhibits their rotary motions in the opposite direction. Accordingly, the $1^{st}$ speed position is established with an automatic engaging action of the one-way clutch F1, without the engaging action of the brake B2, when power is transmitted in the forward direction from the engine 14 toward the drive wheels 34.

Referring back to FIG. 1, the vehicle 10 is provided with an electronic control device (ECU) 100 including a control apparatus for the automatic transmission 18, which is configured to implement a shift control and other controls of the automatic transmission 18. The electronic control device 100 includes a so-called microcomputer incorporating a CPU, a RAM, a ROM and an input-output interface. The CPU performs signal processing operations according to programs stored in the ROM, while utilizing a temporary data storage function of the RAM, to implement various controls of the vehicle 10. For instance, the electronic control device 100 implements the output control of the engine 14, the shift control of the automatic transmission 18, and a torque capacity control of the lock-up clutch 38. The electronic control device 100 may include mutually independent control units for respective different controls such as an engine output control unit and a hydraulic control unit, as needed.

The electronic control device 100 is configured to receive various signals including: an output signal of an engine speed sensor 52 indicative of an operating speed $N_E$ of the engine 14; an output signal of a turbine speed sensor 54 indicative of a turbine speed $N_T$ of the torque converter 16, namely, the transmission input speed $N_{IN}$, which is a rotating speed of the transmission input shaft 36; an output signal of an output shaft speed sensor 56 indicative of the transmission output speed $N_{OUT}$, which is the rotating speed of the output shaft 24 corresponding to the vehicle running speed V; an output signal of a throttle sensor 58 indicative of an opening angle $\theta_{TH}$ of an electronic throttle valve not shown; an output signal of an intake air quantity sensor 60 indicative of an intake air quantity $Q_{AIR}$ of the engine 14; an output signal of an acceleration sensor 62 indicative of a longitudinal acceleration value G (or longitudinal deceleration value G) of the vehicle 10; an output signal of a cooling water temperature sensor 64 indicative of a temperature THw of a cooling water of the engine 14; an output signal of an oil temperature sensor 66 indicative of a temperature $TH_{OIL}$ of a working oil within the hydraulic control circuit 50; an output signal of an accelerator pedal operation amount sensor 68 indicative of an operation amount Acc of an accelerator pedal 70, which represents a vehicle drive force required by the vehicle operator to drive the vehicle 10 (an operator's required vehicle output); an output signal of a foot brake sensor 72 indicative of an operation amount Bra of a brake pedal 74, which represents a braking force required by the vehicle operator to brake the vehicle 10 (an operator's required vehicle deceleration value); and an output signal of a shift position sensor 76 indicative of a presently selected one of operating positions PSH (such as "P", "N", "D", "R" and "M" positions) of a shift lever 78 (shift lever positions or operating positions), The electronic control device 100 is also configured to generate engine output control command signals $S_E$ for controlling the output of the engine 14, which command signals $S_E$ include: a drive signal for operating a throttle actuator to control the throttle valve opening angle $\theta_{TH}$ according to the accelerator pedal operation amount Acc; a fuel injection signal for controlling an amount of a fuel to be injected from a fuel injecting device; and an ignition timing signal for controlling a timing of ignition of the engine 14 by an igniter. The electronic control device 100 further generates output hydraulic pressure command signals $S_P$ for driving solenoid valves provided within the hydraulic control circuit 50, to control the shifting actions of the automatic transmission 18, which command signals $S_P$ include: electric signals $S_{SL1}$-$S_{SL6}$ (hereinafter referred to as "electric signals $S_{SL}$") for operating a plurality of linear solenoid valves SL1-SL6 (hereinafter referred to as linear solenoid valves SL") provided within the hydraulic control circuit 50, to control the hydraulic actuators for the clutches C and brakes B, to shift the automatic transmission 18; and electric signals for operating linear solenoid valves to regulate a line pressure PL.

The shift lever 78 is manually operable to a selected one of: a parking position "P" in which the automatic transmission 18 is placed in a neutral state for cutting off its power transmitting path, and in which the output shaft 24 is held in a locked state; a reverse-drive position "R" for reverse driving of the vehicle; a neutral position "N" in which the automatic transmission 18 is placed in the neutral state; an automatic forward-drive position "D" in which the automatic transmission 18 is automatically shifted; and a manual forward-drive position "M" for establishing a manual shifting mode in which shift ranges are determined in each of which the automatic shifting actions of the automatic transmission 18 to respective higher-speed ones of the shift positions are not available (or for permitting the automatic transmission 18 to be manually shifted by operations of the shift lever 78). In the manual forward-chive position "M", the brake B2 is placed in the engaged state to establish the $1^{st}$ speed position even while the power is transmitted in the forward direction, so that the vehicle acceleration and deceleration response can be further improved, for instance.

Figure 4:
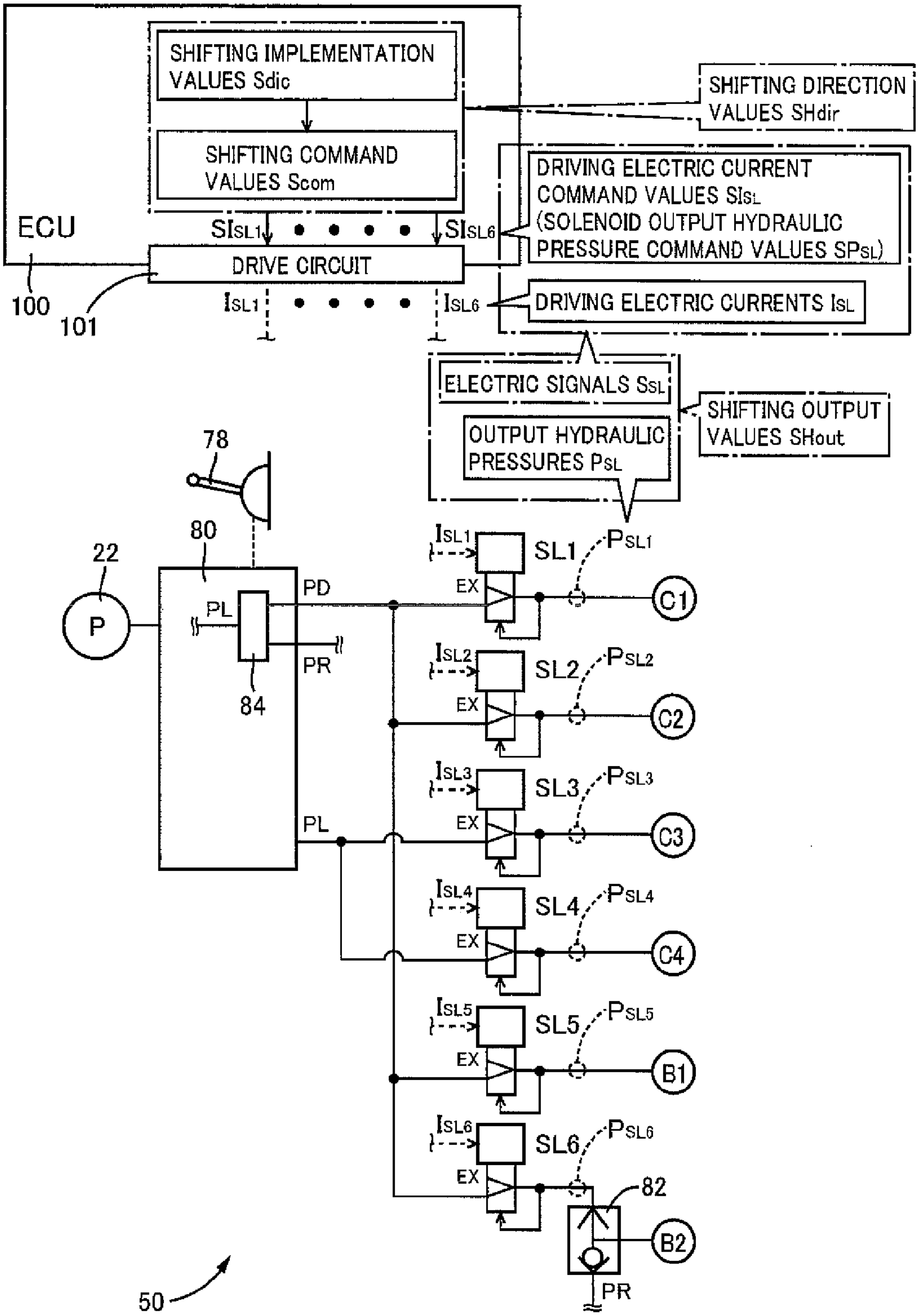
FIG. 4 is a view illustrating a major portion of a hydraulic control circuit shown in FIG. 1, and indicating various signals relating to a shifting control of the automatic transmission.

FIG. 4 is the circuit diagram illustrating a major portion of the hydraulic control circuit 50, which is provided with the linear solenoid valves SL for controlling the operating states of the hydraulic actuators of the clutches C1, C2, C3 and C4 and the brakes B1 and B2. As illustrated in FIG. 4, a D-position pressure (forward-drive-position pressure) PD is applied from a hydraulic pressure supply device 80 to the hydraulic actuators (hydraulic cylinders) of the clutches C1, C2 and brakes B1, B2, through the respective linear solenoid valves SL1, SL2, SL5 and SL6, while the line pressure PL is applied from the hydraulic pressure supply device 80 to the hydraulic actuators of the clutches C3, C4 through the respective linear solenoid valves SL3 and SL4. The hydraulic actuator of the brake B2 receives one of the output pressure of the linear solenoid valve SL6 and a reverse-drive pressure (reverse-drive-position pressure) PR, through a shuttle valve 82. The hydraulic pressure supply device 80 receives the hydraulic pressure from the oil pump 22, and regulates this hydraulic pressure to generate the line pressure PL according to an engine load (e.g., engine torque $T_E$ or transmission input torque $T_{AT}$) as represented by the accelerator pedal operation amount Acc, so that the generated line pressure PL is applied to the various points. The hydraulic pressure supply device 80 is provided with a manual valve 84 mechanically or electrically operated to switch oil passages, according to an operation of the shift lever 78, such that the line pressure PL is generated as the D-position pressure PD or the reverse-drive pressure PR when the shift lever 78 is operated to the automatic forward-drive position "D" or the reverse-drive position "R". All of the linear solenoid valves SL have basically the same construction, and are energized and de-energized independently of each other under the control of the electronic control device 100, to control the hydraulic pressures to be applied to the hydraulic actuators, independently of each other, for controlling the engaging hydraulic pressures of the clutches C and brakes B.

For example, the above-indicated electric signals $S_{SL}$ represent respective driving electric current command values (output electric current command values) $SI_{SL1}$-$SI_{SL6}$ (hereinafter referred to as "driving electric current command values $SI_{SL}$") indicative of respective driving electric currents $I_{SL1}$-$I_{SL6}$ (hereinafter referred to as $I_{SL}$)to be applied from a drive circuit 101 incorporated within the electronic control device 100 (or provided outside the electronic control device 100), to the respective linear solenoid valves SL, as indicated in FIG. 4. That is, the electric signals $S_{SL}$ represent solenoid output hydraulic pressure command values $SP_{SL1}$-$SP_{SL6}$ (hereinafter referred to as "solenoid output hydraulic pressure command signals "$SP_{SL}$") indicative of respective output hydraulic pressures $P_{SL1}$-$P_{SL6}$ (hereinafter referred to as "output hydraulic pressures $P_{SL}$") of the linear solenoid valves SL. It is noted that the driving electric currents $I_{SL}$ per se are a kind of the electric signals $S_{SL}$. It is also noted that the electric signals $S_{SL}$ and the output hydraulic pressures $P_{SL}$ are shifting output values SHout generated according to shifting direction values SHdir requiring the shifting control of the automatic transmission 18 (for example, according to shifting command values Scom commanding to implement the shifting control of the automatic transmission 18). It is further noted that shifting implementation values Sdic on the basis of which the electronic control device 100 determines a need for implementing the shifting control of the automatic transmission 18 and generates the shifting command values Scom may be considered as a kind of the above-indicated shifting direction values SHdir.

Figure 5:
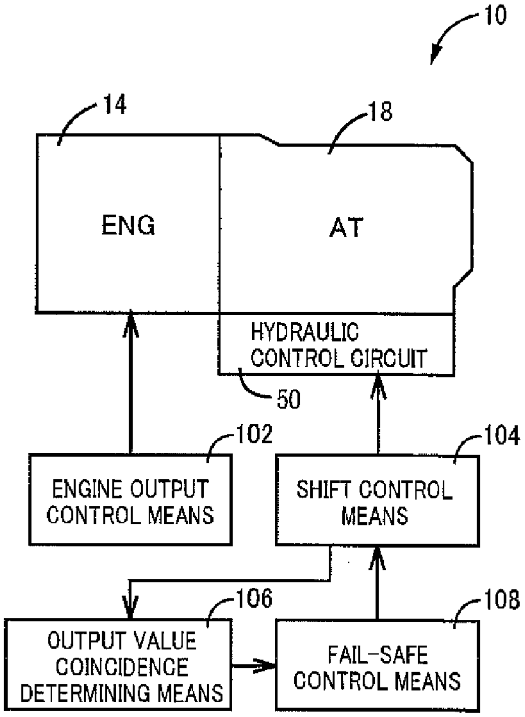
FIG. 5 is a functional block diagram for explaining major control functions of an electronic control device.
Figure 6:
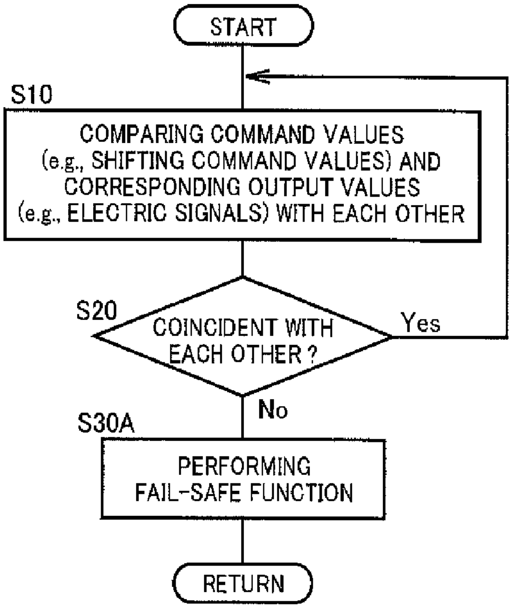
FIG. 6 is a flow chart illustrating a major control operation of the electronic control device, that is, a control operation which permits a fail-safe function to be adequately performed in the event of occurrence of an abnormality of the electronic control device, without a fail-safe valve provided in the hydraulic control circuit.

FIG. 5 is the functional block diagram for explaining major control functions of the electronic control device 100. An engine output control portion in the form of engine output control means 102 shown in FIG. 5 is configured to generate the engine output control command signals $S_E$ for controlling the throttle actuator to open and close the electronic throttle valve, controlling the fuel injecting device to control the amount of injection of the fuel, and controlling the igniter to control the time of ignition. For example, the engine output control means 102 calculates a target engine torque $T_E$* on the basis of the accelerator pedal operation amount Acc such that the target engine torque $T_E$* increases with an increase of the accelerator pedal operation amount Acc. -The engine output control means 102 controls the throttle actuator for controlling the opening angle $\theta_{TH}$ of the electronic throttle valve so as to obtain the above-indicated target engine torque $T_E$*, on the basis of the actual engine speed $N_E$, and according to a known relationship (such as an engine torque map) between the engine speed $N_E$ and an estimated engine torque $T_{E0}$, which relationship is obtained by experimentation in relation to the opening angle $\theta_{TH}$ of the electronic throttle valve, and stored in a memory.

A shift control portion in the form of shift control means 104 is configured to determine whether a shifting action of the automatic transmission 18 should be performed or not, that is, to select the shift position to which the automatic transmission 18 should be shifted. This determination is made on the basis of the vehicle running condition represented by the actual vehicle running speed V and accelerator pedal operation amount Acc, and according to a known relationship (shifting map) which is stored in a memory and which represents shift-up lines and shift-down lines defined in relation to variables in the form of the vehicle running speed V and the accelerator pedal operation amount Acc (or output torque $T_{OUT}$ of the automatic transmission), for instance. For example, the shift control means 104 sets, as the shifting implementation value or values Sdic, a value (n) requiring the automatic transmission 18 to maintain an n-th shift position, value [(n) (n+1)] requiring a shift-up action of the automatic transmission 18 from the n-th shift position to the (n+1)th shift position, or value [(n)→(n=1)] requiring a shift-down action of the automatic transmission 18 from the n-th shift position to the (n−1)th shift position. Further, the shift control means 104 performs an excepting processing operation on the basis of roadway conditions such as an uphill or downhill running condition, with respect to the above-indicated shifting implementation value(s) Sdic, to set, as the shifting command values Scom, the driving electric currents $I_{SL}$ corresponding to the coupling devices placed in the engaged state to hold the automatic transmission 18 in the n-th shift position represented by the value (n), or the driving electric currents $I_{SL}$ corresponding to the coupling devices relating to the shifting action indicated by the value [(n)→(n+1)] or the value [(n)→(n−1)]. Where the shifting implementation value Sdic is (n=2), for instance, the shift control means 104 sets, as the shifting command values Scom, the values of the driving electric currents $I_{SL2}$ and $I_{SL5}$ required to hold the clutch C1 and brake B1 to be placed in the engaged state to maintain the $2^{nd}$ speed position, and sets the values of the other driving electric currents $I_{SL}$ to be zero. Where the shifting implementation values Sdic are [2→3] as [n→(n+1)], the shift control means 104 varies the driving electric currents $I_{SL}$ from those for (n=2) to those for (n=3), namely, sets as the shifting command values Scom, the value of the driving electric current $I_{SL2}$ gradually decreasing to zero so that the brake B1 which has been placed in the engaged state to establish the $2^{nd}$ speed position is gradually brought into its released state, and the transitional value of the driving electric current $I_{SL3}$ so that the clutch C3 which has been placed in the released state is brought into its engaged state to establish the $3^{rd}$ speed position.

Then, the shift control means 104 generates the driving electric current command values $SI_{SL}$ (solenoid output hydraulic pressure command values $SP_{SL}$) corresponding to the respective shifting command values Scom, for implementing the automatic shifting control of the automatic transmission 18. For example, the generated driving electric current command values $SI_{SL}$ correspond to the respective predetermined values of the driving electric currents $I_{SL}$ of the shifting command values Scom. If the predetermined value of the driving electric current $I_{SL}$ is zero, the corresponding driving electric current command value $SI_{SL}$ per se need not be generated. Thus, the driving electric currents $I_{SL}$ corresponding to the driving electric current command values $SI_{SL}$ are applied from the drive circuit 101 to the hydraulic control circuit 50. At this time, the shift control means 104 applies the output hydraulic pressure command signals $S_P$ to the hydraulic control circuit 50, for engaging and/or releasing the coupling devices associated with the shifting action of the automatic transmission 18 to be performed, as indicated in the table of FIG. 3, for establishing the selected shift position. According to the driving electric currents $I_{SL}$ applied to the hydraulic control circuit 50, appropriate ones of the linear solenoid valves SL within the hydraulic control circuit 50 are energized to operate the hydraulic actuators of the corresponding frictional coupling devices. Thus, the shift control means 104 energizes and de-energizes the appropriate ones of the linear solenoid valves SL for engaging and releasing the corresponding ones of the clutches C and brakes B, to establish the selected shift position.

In the hydraulic control circuit 50 according to the present embodiment, any of the linear solenoid valves SL has a risk of occurrence of an abnormal output due to an abnormality of the electronic control device 100 per se. For instance, an abnormal output of any of the linear solenoid valves SL may take place due to an abnormality of the electronic control device 100 per se, where the corresponding driving electric current command value $SI_{SL}$ which should be normally coincident with the shifting command value Scom and should be normally zero or absent is erroneously other than zero or present (that is, where the driving electric current command value $SI_{SL}$ is abnormal), with a result of bringing the corresponding coupling device into its engaged state. For reducing the weight and size of the hydraulic control circuit 50 and for reducing the number of the required components, however, the hydraulic control circuit 50 according to the present embodiment is not provided with a known conventional fail-safe valve having a fail-safe function for dealing with the abnormal output of any of the linear solenoid valves SL. Accordingly, any irrelevant one of the frictional coupling devices which is not normally required to be placed in the engaged state for placing the automatic transmission 18 in the selected shift position is brought into the engaged state, when the abnormal output of any of the linear solenoid valves takes place. In this event, the engaging action of the above-indicated irrelevant frictional coupling device may cause the automatic transmission 18 to perform an unnecessary shifting action to a shift position other than the shift position that should be normally established [for example, a shifting action causing a comparatively high ratio of a stepping change of the speed ratio of the automatic transmission 18 (stepping ratio=ratio of speed ratios γ of two shift positions=speed ratio of the lower-speed position/speed ratio of the higher-speed position)], or may cause a partially engaging action (a slipping action) of one of the frictional coupling devices to be normally placed in its engaged state, which one frictional coupling device has the smallest torque capacity. Described more specifically, when an abnormal output of the linear solenoid valve SL1 takes place with an abnormal output of the driving electric current command value $SI_{SL1}$ while the $7^{th}$ speed position is established with the clutches C2 and C3 being placed in the engaged state, one of the clutches C1, C2 and C3 which has the smallest torque capacity may be brought into a slipping state, so that one of the $3^{rd}$, $5^{th}$ and $7^{th}$ speed positions may be established by the engaging actions of the other two clutches.

In view of the above-indicated risk, the present electronic control device 100 is configured to perform an adequate fail-safe function if the above-indicated shifting direction values SHdir and the above-indicated shifting output values SHout are not coincident with each other, for thereby assuring the adequate fail-safe function in the event of occurrence of an abnormality of the electronic control device 100 per se.

Described more specifically, an output value coincidence determining portion in the form of output value coincidence determining means 106 shown in FIG. 5 is configured to compare the values of the driving electric currents $I_{SL}$ set as the shifting command values Scom by the shift control means 104, and the actually generated driving electric current command values $SI_{SL}$, with each other, for determining whether the shifting command values Scom and the driving electric current command values $SI_{SL}$ are coincident with each other, to thereby determine whether the above-indicated shifting direction values SHdir and the above-indicated shifting output values SHout are coincident with each other.

The output value coincidence determining means 106 is further configured to determine any of the driving electric current command values $SI_{SL}$ which is not coincident with the corresponding shifting command value Scom, that is, to determine any abnormally generated driving electric current command value $SI_{SL}$, according to a table of coincidence such as the table of FIG. 3 stored in a memory, which table indicates the relationship between the plurality of shift positions of the automatic transmission 18, and the respective combinations of the frictional coupling devices to be placed in the engaged state. Namely, the output value coincidence determining means 106 determines the frictional coupling devices required to establish or maintain the shift position corresponding to the above-indicated shifting implementation values Sdic on which the above-indicated shifting command values Scom are set. This determination is made on the basis of the above-indicated table of coincidence. The output value coincidence determining means 106 determines that each of the driving electric current command values $SI_{SL}$ other than those for driving the linear solenoid valves SL corresponding to the determined frictional coupling devices, which each of the command value $SI_{SL}$ is other than zero or present and causes an engaging action of the corresponding other frictional coupling devices, is the above-indicated abnormally generated driving electric current command value $SI_{SL}$.

A fail-safe control portion 108 in the form of fail-safe control means 108 is configured to perform the above-described fail-safe function, when the output value coincidence determining means 106 has determined that the above-indicated shifting direction values SHdir and the above-indicated shifting output values SHout are not coincident with each other, that is, when the above-indicated shifting output values SHout are abnormal. The fail-safe function is performed by generating a shifting-command-value changing command commanding the shift control means 104 to change the above-indicated shifting command values Scom, on the basis of the abnormally generated (namely, abnormal) driving electric current command value or values $SI_{SL}$. For instance, the fail-safe control means 108 performs the above-indicated fail-safe function, by generating the shifting-command-value changing command commanding the shift control means 104 to change the present shifting command values Scom to the shifting command values Scom for establishing any shift position which is to be established using the frictional coupling device which is to be brought into its engaged state with the output hydraulic pressure $P_{SL}$ of the abnormal linear solenoid valve SL driven with the abnormally generated driving electric current command value $SI_{SL}$. That is, the fail-safe control means 108 generates the shifting-command-value changing command commanding the shift control means 104 to change the present shifting command values Scom, so as to establish any shift position which is to be established by the engaging actions of a combination of the frictional coupling devices at least one of which is brought into the engaged state with the output hydraulic pressure $P_{SL}$ of the abnormal linear solenoid valve SL. Described in detail, where the clutch C1 is erroneously brought into its engaged state with the abnormally generated driving electric current command value $SI_{SL1}$ while the shifting command values Scom7 are presently set for establishing the $7^{th}$ speed position, the present shifting command values Scom7 are changed to the values Scom1, Scom2, Scom3, Scom4 or Scom5 for establishing one of the $1^{st}$ through $5^{th}$ speed positions which are to be established using the clutch C1 to be erroneously brought into the engaged state. Where the clutch C3 is erroneously brought into its engaged state with the abnormally generated driving electric current command value $SI_{SL3}$ while the shifting command values Scom5 are presently set for establishing the $5^{th}$ speed position, the present shifting command values Scom5 are changed to the values Scom3 or Scom7 for establishing the $3^{rd}$ or $7^{th}$ speed position which is to be established using the clutch C3 to be erroneously brought into the engaged state.

By the way, a change of the shifting command values Scom causes a shift-down action of the automatic transmission, with a result of a comparatively high ratio of the stepping change of the speed ratio of the automatic transmission 18, giving rise to a risk of a rise of the engine speed, vehicle deceleration due to an engine braking effect, deterioration of durability of the engine 14 and the power transmitting system 12, and reduction (deterioration) of vehicle drivability. For instance, an abnormal output of the driving electric current command value $SI_{SL1}$ while the shifting command values Scom7 are set results in a shift-down action of the automatic transmission 18 from the $7^{th}$ speed position to one of the $1^{st}$ through $5^{th}$ speed positions, giving rise to a risk of a comparatively high ratio of the stepping change of the speed ratio of the automatic transmission 18, and an abnormal output of the driving electric current command value $SI_{SL3}$ while the shifting command values Scom5 are set results in a shift-down action of the automatic transmission 18 from the $5^{th}$ speed position to the $3^{rd}$ speed position or a shift-up action from the $5^{th}$ speed position to the $7^{th}$ speed position, also giving rise to a risk of a comparatively high ratio of the stepping change of the speed ratio of the automatic transmission 18. In this respect, the shift-down action from the $7^{th}$ speed position to the $5^{th}$ speed position rather than to one of the other $1^{st}$ through $4^{th}$ speed positions is desirable in the event of the abnormal output of the driving electric current command value $SI_{SL1}$ while the shifting command values Scom7 are set, because the shift-down action from the $7^{th}$ speed position to the $5^{th}$ speed position causes the lowest stepping change between the speed ratios of the shifting. Further, the shift-up action from the $5^{th}$ speed position to the $7^{th}$ speed position rather than the shift-down action from the $5^{th}$ speed position to the $3^{rd}$ speed position is desirable in the event of the abnormal output of the driving electric current command value $SI_{SL3}$ while the shifting command values Scom5 are set.

In view of the above-described finding, the fail-safe control means 108 performs the above-indicated fail-safe function by generating the shifting-command-value changing command commanding the shift control means 104 to change the present shifting command values Scom for implementing the shifting action to the shift position to be normally established where the output value coincidence determining means 106 determines that the above-indicated shifting direction values SHdir and the above-indicated shifting output values SHout are coincident with each other, to the shifting command values Scom for implementing one of the shifting actions to the respective shift positions to be established using the frictional coupling device to be brought into the engaged state with the output hydraulic pressure $P_{SL}$ of the linear solenoid valve SL abnormally driven with the abnormally generated driving electric current command value $SI_{SL}$, which one shifting action causes the lowest ratio of the stepping change of the speed ratio of the automatic transmission 18, or for implementing a shift-up action of the above-indicated shifting actions.

Figure 7:
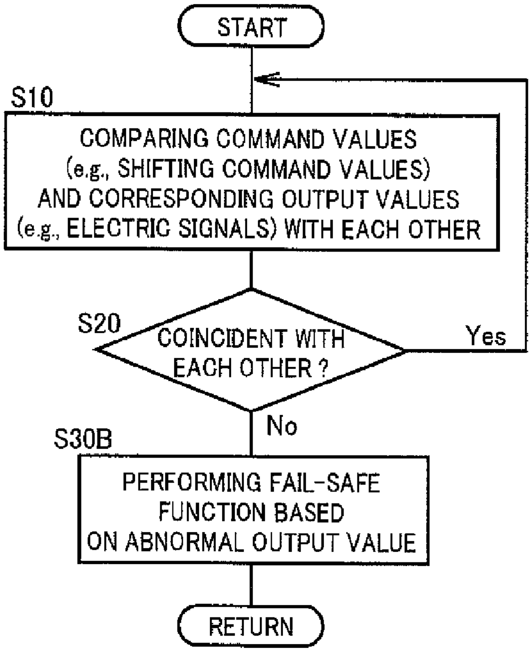
FIG. 7 is a flow chart corresponding to that of FIG. 6, showing another embodiment of this invention.
Figure 8:
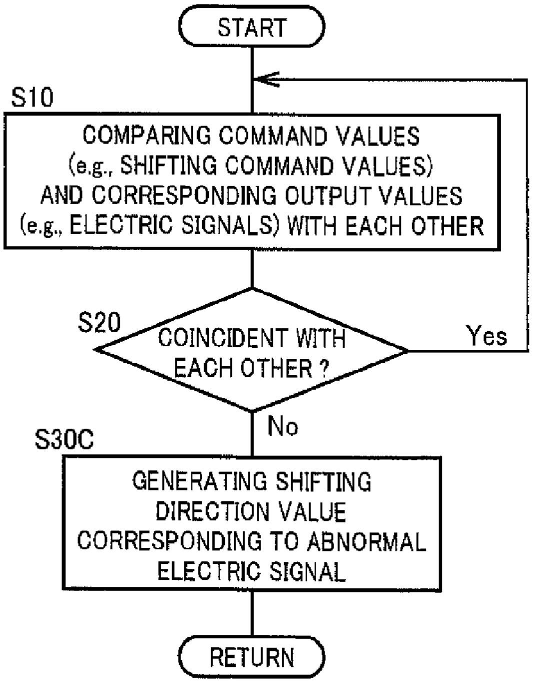
FIG. 8 is a flow chart corresponding to that of FIG. 6, showing a further embodiment of the invention.
Figure 9:
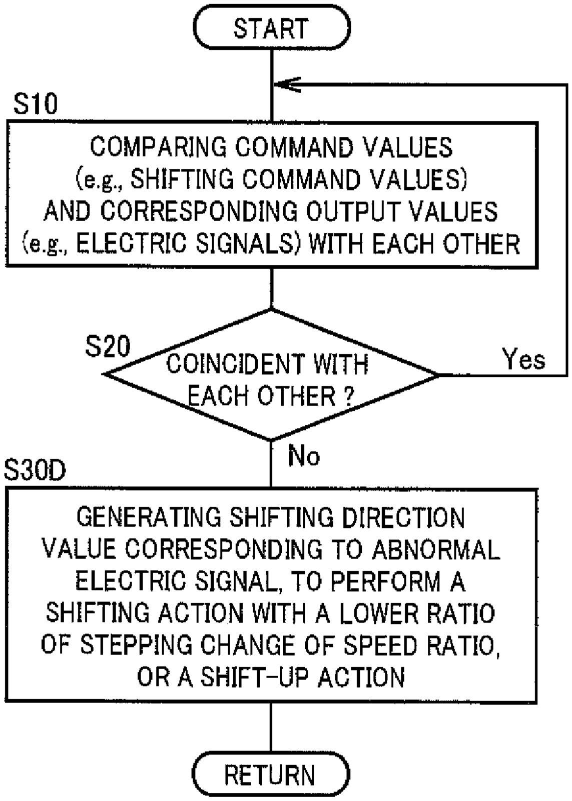
FIG. 9 is a flow chart corresponding to that of FIG. 6, showing a yet further embodiment of the invention.

FIGS. 6, 7, 8 and 9 are flow charts illustrating major control operations of the electronic control device 100, that is, control operations which permit a fail-safe function to be adequately performed in the event of occurrence of an abnormality of the electronic control device 100, without a fail-safe valve provided in the hydraulic control circuit 50. These control operations are repeatedly performed with an extremely short cycle time of about several milliseconds to several tens of milliseconds, for example. The flow charts of FIGS. 7, 8 and 9 illustrate respective embodiments of this invention different from the embodiment illustrated in the flow chart of FIG. 6. The embodiments of FIGS. 6, 7, 8 and 9 are identical with each other, except for steps S30A, S30B, S30C and S30D.

Referring to FIGS. 6, 7, 8 and 9, a step S10 (hereinafter "step" being omitted) corresponding to the output value coincidence determining means 106 is initially implemented to compare the above-indicated shifting direction values SHdir and the above-indicated shifting output values SHout with each other. For example, the driving electric currents $I_{SL}$ set by the shifting command values Scom and the actually generated driving electric current command values $SI_{SL}$ are compared with each other. Then, the control flow goes to S20 also corresponding to the output value coincidence determining means 106, to determine whether the above-indicated shifting command values Scom and the above-indicated driving electric current command values $SI_{SL}$ are coincident with each other, to thereby determine whether the above-indicated shifting direction values SHdir and the above-indicated shifting output values SHout are coincident with each other. If an affirmative determination is obtained in S20, the control flow goes back to S10. If a negative determination is obtained in S20, the control flow goes to S30A, S30B, S30C or S30D corresponding to the fail-safe control means 108, to perform the above-described predetermined fail-safe function. In the fail-safe control in S30B of FIG. 7, the above-indicated shifting command values Scom are changed on the basis of (based on) the abnormally generated driving electric current command value $SI_{SL}$ (i.e. on the premise that the driving electric current command value $SI_{SL}$ is abnormally generated). In the fail-safe control in S30C of FIG. 8, the present shifting command values Scom are changed to those for establishing one of the shift positions which are to be established using the engaging action of the frictional coupling device which takes place with the output hydraulic pressure $P_{SL}$ of the linear solenoid valve SL abnormally driven by the abnormally generated driving electric current command value $SI_{SL}$. In the fail-safe control in S30D of FIG. 9, the present shifting command values Scom for shifting the automatic transmission to the shift position to be established when the above-indicated shifting direction values SHdir and the above-indicated shifting output values SHout are coincident to each other, are changed to the shifting command values Scom for shifting the automatic transmission to one of the shift positions to be established using the engaging action of the frictional coupling device which takes place with the output hydraulic pressure $P_{SL}$ of the linear solenoid valves SL abnormally driven by the abnormally generated driving electric current command value $SI_{SL}$, such that the shifting action to the above-indicated one of the shift positions causes the lowest ratio of the stepping change of the speed ratio of the automatic transmission, or a shift-up action.

The present embodiment described above is configured to perform the predetermined fail-safe function when the above-described shifting direction values SHdir and the above-described shifting output values SHout are not coincident with each other, so that the fail-safe function thus performed makes it possible to minimize an influence of an abnormality of the electronic control device 100 per se, in the event of the engaging action of the irrelevant frictional coupling device taking place due to the abnormality of the electronic control device 100, which irrelevant frictional coupling device is other than the frictional coupling devices normally required to be placed in the engaged state for establishing the presently selected shift position of the automatic transmission 18. Thus, the present embodiment makes it possible to perform an adequate fail-safe function in the event of occurrence of an abnormality of the electronic control device 100 per se, without providing the hydraulic control circuit 50 with a fail-safe valve.

The present embodiment is further configured to perform the predetermined fail-safe function is performed by changing any of the shifting direction values SHdir with which a part of a corresponding one of the shifting output values SHout is not coincident when the shifting direction values SHdir are not coincident with the shifting output values SHout. Accordingly, the fail-safe function can be adequately performed by utilizing the engaging action of the irrelevant frictional coupling device taking place due to the abnormality of the electronic control device 100 per se, which irrelevant frictional coupling device is other than the frictional coupling devices normally required to be placed in the engaged state for establishing the presently selected shift position of the automatic transmission 18.

The present embodiment is also configured to determine any part of the above-described shifting output values SHout which is not coincident with the corresponding one of the above-described shifting direction values SHdir, according to the table of coincidence as shown in FIG. 3 and stored in the memory, which table indicates the relationship between the plurality of shift positions of the automatic transmission 18 and the respective combinations of the frictional coupling devices to be placed in the engaged state. Accordingly, it is possible to adequately determine whether each of the shifting direction values SHdir and the corresponding one of the shifting output values SHout are coincident with each other, and to perform the fail-safe function with a high degree of stability, on the basis of any of the shifting output values SHout which is not coincident with the corresponding one of the shifting output direction SHdir when the shifting direction values SHdir are not coincident with the shifting output values SHout.

The present embodiment is further configured such that the above-described predetermined fail-safe function is performed by implementing a shifting action of the automatic transmission 18 to one of the shift positions, using an engaging action of the frictional coupling device which takes place with the output hydraulic pressure $P_{SL}$ of one of the linear solenoid valves SL which corresponds to one of the shifting output values SHout which is not coincident with the corresponding shifting direction value SHdir, when the shifting direction values SHdir are not coincident with the shifting output values SHout. Accordingly, the fail-safe function can be adequately performed by utilizing the engaging action of the irrelevant frictional coupling device taking place due to the abnormality of the electronic control device 100 per se, which irrelevant frictional coupling device is other than the frictional coupling devices normally required to be placed in the engaged state for establishing the presently selected shift position of the automatic transmission 18. For example, the fail-safe function makes it possible to avoid a problem that the engaging action of the irrelevant friction coupling device causes a partially engaging action of one of the frictional coupling devices which are to be normally placed in its engaged state.

The present embodiment is also configured such that the automatic transmission 18 is shifted from the shift position to be established when the above-indicated shifting direction values SHdir and the above-indicated shifting output values SHout are coincident to each other, to the above-indicated one of the shift positions to be established using the engaging action of the frictional coupling device which takes place with the output hydraulic pressure $P_{SL}$ of one of the above-described linear solenoid valves SL which corresponds to one of the above-indicated shifting output values SHout which is not coincident with the corresponding shifting direction value SHdir, such that the shifting action to the above-indicated one of the shift positions causes a lowest stepping change between speed ratios of the shifting, or a shift-up action. Accordingly, the fail-safe function makes it possible to prevent any shift-down action of the automatic transmission 18 causing a comparatively high ratio of the stepping change of the speed ratio, in the event of occurrence of an abnormality of the electronic control device 100 per se, and the consequent engaging action of the irrelevant frictional coupling device other than the frictional coupling devices normally required to be placed in the engaged state for establishing the presently selected shift position of the automatic transmission 18. Accordingly, it is possible to minimize a rise of the engine speed $N_E$, and vehicle deceleration due to an engine braking torque, which take place in the event of occurrence of the abnormality of the electronic control device 100 per se, and which may result in reduction of durability of the engine 14 and the power transmitting system 12 and reduction (deterioration) of drivability of the vehicle.

The present embodiment is also configured such that the above-described shifting direction values SHdir are the shifting command values Scom while the above-described shifting output values SHout are the driving electric current command values (output electric current command values) $SI_{SL}$ (solenoid output hydraulic pressure command values $SP_{SL}$). Accordingly, the fail-safe function can be adequately performed in the event of occurrence of an abnormality of the electronic control device 100 per se, depending upon whether the above-indicated shifting direction values SHdir and the above-indicated shifting output values SHout are coincident with each other.

While the preferred embodiments of this invention have been described in detail by reference to the drawings, it is to be understood that the present invention may be otherwise embodied.

In the illustrated embodiments, the fail-safe function is performed in the event of occurrence of an abnormality of the electronic control device 100 per se, on the basis of the shifting command values Scom used as the above-indicated shifting direction values SHdir, and one of the above-indicated electric signals $S_{SL}$ representing the driving electric current command values $SI_{SL}$ used as the above-indicated shifting output values SHout. However, the shifting command values Scom and the driving electric current command values $SI_{SL}$ which are used in the illustrated embodiments by way of example may be replaced by other equivalent signals. For instance, the shifting implementation values Sdic may be used as the shifting direction values SHdir, and the electric signals $S_{SL}$ representing the driving electric currents $I_{SL}$ or the output hydraulic pressures $P_{SL}$ of the linear solenoid valves SL may be used as the above-indicated shifting output values SHout. In these cases, too, the fail-safe function can be adequately performed in the event of occurrence of an abnormality of the electronic control device 100 per se, depending upon whether the above-indicated shifting direction values SHdir and the above-indicated shifting output value SHout are coincident with each other. Where the driving electric currents $I_{SL}$ are used, the driving electric currents $I_{SL}$ are detected by various methods, for example, detected directly by electric current sensors, or indirectly on the basis of amounts of voltage drops at resistors provided in wires used to apply the driving electric currents $I_{SL}$. Where the output hydraulic pressures $P_{SL}$ of the linear solenoid valves SL are used, the output hydraulic pressures $P_{SL}$ are detected by hydraulic pressure sensors. Threshold values used for the determination as to whether the above-indicated shifting direction values SHdir and the above-indicated shifting output value SHout are coincident with each other can be determined by taking account of a suitable amount of tolerance in view of signal noises and accuracy of detection of the sensors.

In the illustrated embodiments, the automatic transmission is shifted to one of the shift positions to be established using the engaging action of the frictional coupling device which takes place with the output hydraulic pressure $P_{SL}$ of the abnormally driven linear solenoid valve SL, such that the shifting action from the present shift position to the above-indicated one of the shift positions causes the lowest ratio of the stepping change of the speed ratio or a shift-up action. However, any additional condition such as to minimize switching operations of engaging/releasing of the coupling devices in shifting from the present shift position may be used to determine the shift position to which the automatic transmission is shifted from the present shift position in the event of an abnormal operation of any linear solenoid valve SL.

In the illustrated embodiments, the automatic transmission 18 is configured to be shifted to one of shift positions, with engaging actions of respective combinations of two frictional coupling devices. However, the shift positions may be established with concurrent engaging actions of respective combinations of three or more frictional coupling devices.

While the torque converter 16 provided as a fluid-operated power transmitting device is provided with the lock-up clutch 38 in the illustrated embodiment, the torque converter 16 need not be provided with the lock-up clutch 38. Further, the torque converter 16 may be replaced by any other type of fluid-operated power transmitting device, such as a fluid coupling which does not perform a torque boosting function.

It is to be understood that the present invention has been described above for illustrative purpose only, and that the invention may be embodied with various other changes and improvements, which may occur to those skilled in the art.

Nomenclature of Elements

18: Vehicular automatic transmission
50: Hydraulic control circuit
100: Electronic control device (Control apparatus)
C: Clutches (Frictional coupling devices)
B: Brakes (Frictional coupling devices)
SL1-SL6: Linear solenoid valves (Solenoid valves)

The invention claimed is:

1. A control apparatus for a vehicular automatic transmission configured to selectively establish a plurality of shift positions by respective combinations of frictional coupling devices of a plurality of frictional coupling devices in an engaged state thereof, with output hydraulic pressures of respective ones of a plurality of solenoid valves provided in a hydraulic control circuit, comprising:

a shift control portion configured to implement a shifting control of said vehicular automatic transmission, a fail-safe control portion configured to perform a predetermined fail-safe function when shifting direction values requiring said shifting control of said vehicular automatic transmission and shifting output values respectively generated according to said shifting direction values are not coincident with each other, said shifting output values being represented by respective electric signals for driving said plurality of solenoid valves, said fail-safe control portion performing said predetermined fail-safe function in a case that the shifting direction values and the shifting output values are not coincident each other by commanding said shift control portion to implement a shifting action of the vehicular automatic transmission to one of the shift positions, using an engaging action of the frictional coupling device which takes place with an output hydraulic pressure of one of said solenoid valves which corresponds to one of said shifting output values which is not coincident with the corresponding shifting direction value, in a case that all shifting actions from the shift position to be established when said shifting direction values and said shifting output values are coincident to each other, to said plurality of the shift positions to be established using the engaging action of the frictional coupling device which takes place with the output hydraulic pressure of one of said solenoid valves which corresponds to one of said shifting output values which is not coincident with the corresponding shifting direction value are shift-down actions, the shifting action to said one of the shift positions to be established when said predetermined fail-safe function is performed being a shift-down action causing a lowest stepping change between speed ratios of the shifting, and in a case that the shifting actions from the shift position to be established when said shifting direction values and said shifting output values are coincident to each other, to said plurality of the shift positions to be established using the engaging action of the frictional coupling device which takes place with the output hydraulic pressure of one of said solenoid valves which corresponds to one of said shifting output values which is not coincident with the corresponding shifting direction value are both a shift-up action and a shift-down action, the shifting action to said one of the shift positions to be established when said predetermined fail-safe function is performed being a shift-up action.

2. The control apparatus according to claim 1, wherein said fail-safe control portion performs said predetermined fail-safe function in a case that the shifting direction values and the shifting output values are not coincident each other by changing any of said shifting direction values with which a corresponding one of said shifting output values is not coincident.

3. The control apparatus according to claim 2, further comprising an output value coincidence determining portion configured to determine any of said shifting output values which is not coincident with the corresponding one of said shifting direction values, according to a table of coincidence stored in a memory, which table indicates a relationship between said plurality of shift positions and said respective combinations of the frictional coupling devices to be placed in the engaged state.

4. The control apparatus according to claim 1, wherein said shifting direction values are shifting command values commanding said shift control portion to implement the shifting control of said vehicular automatic transmission, or shifting implementation values on the basis of which a need for implementing said shifting control is determined.

5. A control apparatus for use in a vehicular automatic transmission, the control apparatus being configured to selectively establish a plurality of shift positions by respective combinations of a plurality of frictional coupling devices in an engaged state, the shift positions of the frictional coupling devices being established by a hydraulic control circuit having a plurality of solenoid valves configured to output different hydraulic pressures representing different shift positions of the frictional coupling devices, the control apparatus comprising:

an electronic control unit programmed to:

execute a shifting operation in the vehicular automatic transmission including generating shifting direction values;

perform a predetermined fail-safe function in response to the shifting direction values requiring the shifting operation being not coincident with shifting output values respectively generated based on the shifting direction values, the shifting output values being represented by respective electric signals for driving the solenoid valves, the predetermined fail-safe function including initiating a shifting action of the vehicular automatic transmission to one of the shift positions based on an engaging action of the frictional coupling device which takes place with an output hydraulic pressure of one of the solenoid valves corresponding to one of the shifting output values that is not coincident with the corresponding shifting direction value, wherein:

in a case for shifting actions from the shift position to be established when the shifting direction values are coincident with the shifting output values, to the shift positions to be established using the engaging action of the frictional coupling device which takes place with the output hydraulic pressure of one of said solenoid valves which corresponds to one of said shifting output values which is not coincident with the corresponding shifting direction value are shift-down actions, the shifting action to one of the shift positions to be established when said predetermined fail-safe function is performed is a shift-down action causing a lowest stepping change between speed ratios in the shifting action, and in a case for shifting actions from the shift position to be established when the shifting direction values are coincident with the shifting output values, to the shift positions to be established using the engaging action of the frictional coupling device which takes place with the output hydraulic pressure of one of said solenoid valves which corresponds to one of said shifting output values which is not coincident with the corresponding shifting direction value are both: (i) a shift-up action, and (ii) a shift-down action, the shifting action to the one of the shift positions to be established when said predetermined fail-safe function is performed is a shift-up action.

6. The control apparatus according to claim 5, wherein the electronic control unit performs the predetermined fail-safe function in response to the shifting direction values being not coincident with the shifting output values by changing at least one of the shifting direction values that is not coincident with a corresponding value of the shifting output values.

7. The control apparatus according to claim 6, further comprising:

a memory storing:

a table of coincidence data specifying a relationship between the plurality of shift positions and the respective combinations of the frictional coupling devices in the engaged state; and the electronic control unit further including:

determining that at least one of the shifting output values is not coincident with the corresponding shifting direction value based on the table of coincidence stored in the memory.

8. The control apparatus according to claim 5, wherein the shifting direction values are: (i) shifting command values commanding the electronic control unit to execute the shifting operation of the vehicular automatic transmission, or (ii) shifting implementation values based on which a need for implementing the shifting operation is determined.

* * * * *